United States Patent [19]

Walker et al.

[11] 4,131,444

[45] Dec. 26, 1978

[54] METHOD FOR INCREASING THE STRENGTH AND DENSITY OF LEAD TITANATE CERAMIC BODIES

[75] Inventors: Basil E. Walker, Oxon Hill, Md.; Robert C. Pohanka, Springfield, Va.; Paul L. Smith, Westgate, Md.; Roy W. Rice, Alexandria, Va.

[73] Assignee: The United States of America as represented by the Secretary of the Navy, Washington, D.C.

[21] Appl. No.: 818,710

[22] Filed: Aug. 25, 1977

[51] Int. Cl.$^2$ .................. C03B 11/00; C04B 15/14; C04B 35/00

[52] U.S. Cl. .......................... 65/32; 65/157; 264/82; 264/332; 106/73.3; 106/39.8

[58] Field of Search .............. 65/32, 157; 264/82, 264/332; 106/73.31, 73.3, 39.8

[56] References Cited

U.S. PATENT DOCUMENTS

| | | | |
|---|---|---|---|
| 3,493,403 | 2/1970 | Tung et al. .......................... | 65/32 X |
| 3,639,132 | 2/1972 | Egerton et al. .................. | 264/332 X |
| 3,775,531 | 11/1973 | Smith .................................. | 106/73.3 |
| 3,844,755 | 10/1974 | Angle et al. ............................ | 65/32 |
| 3,886,254 | 5/1975 | Tanaka et al. ........................ | 264/332 |
| 4,019,915 | 4/1977 | Miyavchi et al. ............... | 264/332 X |

FOREIGN PATENT DOCUMENTS

| | | | |
|---|---|---|---|
| 434069 | 2/1975 | U.S.S.R. .................................. | 106/73.3 |
| 471335 | 6/1976 | U.S.S.R. .................................. | 106/73.3 |
| 474519 | 8/1976 | U.S.S.R. .................................. | 106/73.3 |

*Primary Examiner*—S. Leon Bashore
*Assistant Examiner*—Frank W. Miga
*Attorney, Agent, or Firm*—R. S. Sciascia; Philip Schneider; Thomas McDonnell

[57] ABSTRACT

Strengthened and densified ceramic bodies are produced by hot pressing lead titanate powder into a lead titanate ceramic at a pressure from 1000 to 5000 psi and at a temperature from 700 to 1100° C if the atmosphere is reducing or from 700 to 1200° C if the atmosphere is oxidizing and by annealing the lead titanate ceramic at a temperature from 600 to 1100° C in an oxidizing atmosphere for at least four hours.

9 Claims, No Drawings

METHOD FOR INCREASING THE STRENGTH AND DENSITY OF LEAD TITANATE CERAMIC BODIES

BACKGROUND OF THE INVENTION

The present invention pertains generally to ceramic material processing and in particular to the processing of ferroelectric materials.

Ferroelectric materials are dielectric materials with domain structure, which exhibit spontaneous electric polarization. These materials possess relative permittivities of up to $10^5$ and show dielectric hysteresis. Ferroelectric materials are often excellent piezoelectric material, i.e., giving rise to electric polarization when subjected to mechanical strain or producing mechanical deformation when subjected to an applied electric field.

Lead titanate is an example of such a material. Unfortunately, lead titanate, upon cooling through the Curie temperature after the powder has been sintered to a ceramic, loses strength and structural integrity. To correct this problem, additives e.g. zinc oxide, manganese dioxide, and sodium carbonate are included with the lead titanate ($PbTiO_3$). The strength of the resulting materials is typically from 5000 to 7000 psi and the density is from 85 to 95 percent of the theoretical density. Although these strengths and densities are significant improvements, the additives are objectionable on account of the modification of the chemical composition which results in a reduction of the dielectric constant and coupling factor and in an interference with the effectiveness of other additives to densify, lower process temperatures, or modify the microstructure.

SUMMARY OF THE INVENTION

It is therefore an object of this invention to improve the ferroelectric properties and the strength of lead titanate ceramics.

Another object of this invention is to improve the performance of lead titanate ceramics as transducers.

A further object of the present invention is to process lead titanate without the need for additives, which allows the ceramic material to retain its strength and physical integrity after it is cooled below its Curie temperature.

These and other objects are achieved by hot-pressing lead titanate to a ceramic at a pressure from 1000 to 9000 psi and at temperature from 700° to 1100° C. if the atmosphere is reducing or at a temperature from 700° to 1200° C. in an atmosphere containing up to 100 percent oxygen and by annealing the lead titanate at a temperature from 600° to 1100° C. for a period of time from 4 to 40 hours.

DETAILED DESCRIPTION OF THE INVENTION

In the practice of the present invention lead titanate and any additional ingredients are of the same quality and particle sizes as were used previously. The subject method does not present any additional requirements as to the type of material. Thus the lead titanate powder and the other ingredients are at least 98 percent pure with a particle size up to one micron. Of course, powders with a lower purity or a larger particle size may be used but the final ceramic would have a lower quality.

The present invention may be practiced in any equipment capable of subjecting the lead titanate to the required temperature and pressure. For example, a hydraulic press with either a resistance furnace or with an induction furnace may be used. The dies may be graphite, aluminum oxide, magnesium oxide, zirconium oxide, or high-temperature nickel-base super alloys with a liner made of any of the previously recited materials. What is important is the temperature, pressure, and a lack of contamination of the ceramic.

An improved lead titanate ceramic is produced by first hot-pressing lead titanate at a pressure from 1000 to 9000 psi and at a temperature from 700° to 1100° C. of a reducing atmosphere surrounds the lead titanate or at a temperature from 700° to 1200° C. if an oxidizing atmosphere surrounds the lead titanate. It should be noted that a graphite die produces a reducing atmosphere for the lead titanate even though the die is in air or other oxygen-containing gas mixtures. With graphite dies, it is preferred to have the graphite die submerged in a gas mixture with 20 to 25 volume percent of oxygen, e.g., air. While a reducing atmosphere is preferred over an oxidizing atmosphere due to the vastly superior results produced by this type of atmosphere, it is also preferred that the atmosphere is only slightly reducing because the reduction proceeds slower and is therefore more controllable. The heating under pressure is continued until the desired density is obtained. Generally, the heating continues for 10 to 60 minutes.

The preferred pressure and temperature ranges are 900° to 1000° C. and 2000 to 3000 psi. The optimum pressure and temperature would depend on the particular application. These parameters are inversely related and are dependent upon the oxygen content of the atmosphere, the size and shape of the resulting ceramic, and the heating time.

Following the hot-pressing, the lead titanate is preferably annealed at a temperature from 600° to 1100° C. and most preferably from 650° to 800° C. for a period of time from 4 hours to 40 hours and preferably from 10 to 20 hours. The optimum time and temperature depend on the sample size and processing economy. If the ceramic was hot-pressed in an oxidizing atmosphere, the improvement produced by the anneal is less than that for the ceramic which was hot-pressed in a reducing atmosphere. Cooling the ceramic to room temperature is done at a rate sufficiently slow to avoid thermal stresses.

If a graphite die is used, it is adviseable to cool the ceramic and dies to room temperature and remove the dies before annealing the ceramic material. Removing the dies greatly reduces wear of the dies. The cooling rate and the reheating rate should be at a rate sufficiently slow to avoid the thermal stresses.

As the following examples show, unexpectedly superior results are obtained if a reducing atmosphere is used during the hot-pressing. It is not understood why the reduction followed by an oxidation of the ceramic produces such improved results (approximately 170 percent improvement). Nor is it understood why even the hot-pressing method of this invention in an oxidizing atmosphere produces useable ceramic while previous methods required additives for the result.

The following examples are given by way of illustration and are not meant to limit the disclosure or the claims to follow. The examples were carried out in a table-top hydraulic press with a resistance furnace. The hot-press graphite dies were 3.82 cm by 0.64 cm and the hot-press oxide dies were 1.90 cm by 0.64 cm. The modulus-of-rupture specimens taken from the samples prepared in the graphite dies were 2.5 to 3.5 cm in length, 0.5 cm in width, and 0.2 in thickness. The modulus-of-rupture specimens taken from the samples prepared in the oxide dies were 1.6 cm by 0.5 cm by 0.2 cm. Two different lead titanate powders were used. Powder A had a purity of 99% and a particle size of less than one micron and Powder B had a purity of 98% and a particle size of less than one micron. The setter powder for the molds was lead titanate.

A-EXAMPLES

Three test runs were made hot-pressing Powder A in an aluminum die in air at a temperature between 1000° and 1100° C. for 30 minutes. The ceramic was slowly cooled to room temperature and was tested for density and modulus-of-rupture. The results are summarized in Table I.

TABLE I

| Test No. | % Theoretical Density | MOR | Average MOR |
|---|---|---|---|
| 1 | 98% | 16,800 | — |
| 2 | 98% | 15,600 | — |
| 3 | 98% | 17,700 | — |
| Total | — | — | 16.700 |

B-EXAMPLES

Twentyfour test runs were made hot-pressing Powder A in a graphite die in air at a temperature between 1000° and 1100° C. for 30 minutes. Since the lead titanate was hot-pressed in a graphite die, the hot-pressing occurred under reducing conditions. The ceramic and die were cooled to room temperature and the dies were removed. The lead titanate ceramic was heated to the annealing temperature and kept at that temperature in air for 20 hours. After annealing, the ceramic was tested for density and the modulus of rupture. The results are summarized in Table II.

TABLE II

| Anneal Temperature | No. of Tests | % Theoretical Density | Average MOR | MOR Range |
|---|---|---|---|---|
| None | 6 | 97.0 | 28,400 | 24,000–35,700 |
| 600 | 5 | 96.5 | 24,100 | 17,400–27,400 |
| 725 | 4 | 96.0 | 29,600 | 27,500–30,800 |
| 840 | 4 | 95.5 | 22,700 | 21,200–27,400 |
| 1000 | 5 | 90.0 | 12,000 | 10,600–14,000 |

C-EXAMPLES

Twelve test runs were made hot-pressing Powder B in a graphite die in air at a temperature between 1000° and 1100° C. for 30 minutes. After cooling the ceramic and dies to room temperature, the die was removed and the ceramic was heated to the annealing temperature. The anneal lasted twenty hours and was done in air. The density and the modules of rupture were measured after the ceramic cooled to room temperature. The results are shown in Table III.

TABLE III

| Anneal Temp. | No. of Tests | % Theoretical Density | Average MOR | MOR Range |
|---|---|---|---|---|
| 600 | 3 | 97.5 | 14,400 | 12,700–15,100 |
| 840 | 3 | 97.0 | 17,400 | 15,500–19,500 |
| 1000 | 6 | 96.5 | 13,300 | 11,400–14,800 |

D-EXAMPLES

Twenty-three additional tests were conducted on mixtures of Powder A and one or more additives. A mixture was hot-pressed in a graphite die in air at a temperature between 1000° and 1100° C. for 30 minutes. After cooling the ceramic and die to room temperature, the die was removed and the ceramic was annealed in air for twenty hours. Upon cooling, the density and modules of rupture for each ceramic and the results are reported in Table IV.

TABLE IV

| Wt. % of Additive | Anneal Temp. | No. of Tests | % Theoretical Density | Average MOR | MOR Range |
|---|---|---|---|---|---|
| 1 LiF+2 MgO | 725 | 6 | 95.5 | 18,100 | 17,000–19,700 |
| | 900 | 5 | 95 | 17,200 | 11,000–13,700 |
| | 1000 | 4 | 95 | 19,200 | 18,200–20,200 |
| 0.07 ZnO 0.07 TiO$_2$ | 725 | 4 | 88 | 19,000 | 17,300–20,500 |
| 0.26 CaF$_2$ | 725 | 4 | 85 | 12,000 | 11,400–13,900 |

From an analysis of the data several conclusions can be made. Hot-pressing within limits of this invention, lead titanate in either an oxidizing or in a reducing atmosphere produces an usuable ceramic with good strength. Hot-pressing in a reducing atmosphere produces a ceramic surprisingly superior to the excellent ceramic produced by a hot-press in an oxidizing atmosphere. Annealing ceramics which were hot-pressed in a reducing atmosphere increases the modulus of rupture. The optimum annealing temperature appears to be around 725° C. Comparing the results obtained from the C and D examples with the results obtained from the B-examples show that the impurities diminish the quality of the ceramic, but in all cases the ceramic was of an excellent quality. Since previous techniques could only produce a lead titanate ceramic with a modulus of 5000 to 7000 and other ferroelectric materials have a modulus of rupture in the range of 8000 to 12,000, the ceramic produced by the method of this invention provides the art with an exceptional material with numerous applications.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for producing a lead titanate ceramic from a lead titanate composition susceptible to Curie-point degradation which comprises hot-pressing a lead titanate composition comprising at least 98 weight percent of lead titanate with no other constituent in excess of one weight percent to form a lead titanate ceramic at a pressure from 1000 to 9000 psi and at a temperature from 700° C. to 1100° C. if said lead titanate is in a reducing atmosphere or at a temperature from 700° to 1200° C. if said lead titanate is in an oxidizing atmosphere; and cooling said lead titanate ceramic to room temperature.

2. The method of claim 1 which further comprises annealing said lead titanate ceramic at a temperature from 600° C. to 1100° C. in an oxidizing atmosphere for at least four hours and cooling said ceramic to room temperature.

3. The method of claim 1 wherein lead titanate is hot-pressed at a temperature from 900° C. to 1000° C. and at a pressure from 2000 to 3000 psi.

4. The method of claim 3 wherein said atmosphere is reducing.

5. The method of claim 4 which further comprises annealing said lead titanate ceramic at a temperature from 700° C. to 900° C. for at least 6 hours.

6. The method of claim 1 wherein said lead titanate consists of essentially lead titanate.

7. The method of claim 3 wherein said lead titanate composition consists essentially of lead titanate.

8. The method of claim 4 wherein said lead titanate composition consists essentially of lead titanate.

9. The method of claim 5 wherein said lead titanate composition consists essentially of lead titanate.

* * * * *